United States Patent
Byrd, Jr.

(10) Patent No.: US 10,467,819 B2
(45) Date of Patent: Nov. 5, 2019

(54) REAL-TIME SPATIAL AUTHORING IN AUGMENTED REALITY USING ADDITIVE AND SUBTRACTIVE MODELING

(71) Applicant: Authanaviz, LLC, Odenton, MD (US)

(72) Inventor: Barry L. Byrd, Jr., Odenton, MD (US)

(73) Assignee: Authanaviz, LLC, Odenton, MD (US)

( * ) Notice: Subject to any disclaimer, the term of this patent is extended or adjusted under 35 U.S.C. 154(b) by 0 days.

(21) Appl. No.: 16/250,247

(22) Filed: Jan. 17, 2019

(65) Prior Publication Data

US 2019/0304193 A1    Oct. 3, 2019

Related U.S. Application Data

(60) Provisional application No. 62/649,434, filed on Mar. 28, 2018.

(51) Int. Cl.
*G06F 3/01* (2006.01)
*G06K 9/00* (2006.01)
(Continued)

(52) U.S. Cl.
CPC .......... *G06T 19/006* (2013.01); *G06T 17/005* (2013.01)

(58) Field of Classification Search
None
See application file for complete search history.

(56) References Cited

U.S. PATENT DOCUMENTS

2005/0122323 A1* 6/2005 Huang .................... G06T 9/001
345/421

2006/0256112 A1* 11/2006 Heirich .................... G06T 15/00
345/427
(Continued)

OTHER PUBLICATIONS

International Search Report and Written Opinion of the International Searching Authority, International Application No. PCT/US2019/024636 dated Jul. 2, 2019, 17 pages.
(Continued)

*Primary Examiner* — Martin Mushambo
(74) *Attorney, Agent, or Firm* — Jackson Walker L.L.P.

(57) ABSTRACT

A method for spatially authoring data in a data processing system, may include constructing one or more input spatial geometry regions and iterating through each input spatial geometry region to create current cumulative result data and rejecting geometry groups from the current cumulative result data. The method may also include for each particular input spatial geometry region of the one or more input spatial geometry regions, constructing minimal-split BSP trees from the particular input spatial geometry region and current cumulative result data, performing geometry processing by applying an additive modeling comparison rule to keep geometry outside of the particular input spatial geometry region with the current cumulative result data, and keep geometry outside of the current cumulative result data with the particular input spatial geometry region, and performing geometry processing by applying a subtractive modeling comparison rule to keep geometry outside of the input spatial geometry region with the current cumulative result data, and keep geometry inside of the current cumulative result data with the particular input spatial geometry region. The method may further include generating final result geometry after iterating over all of the one or more input spatial geometry regions.

18 Claims, 18 Drawing Sheets

Minimal-split BSP Tree construction avoiding geometry split (faster).

(51) Int. Cl.
*G06K 9/46* (2006.01)
*G06T 7/20* (2017.01)
*G06T 19/00* (2011.01)
*G06T 17/00* (2006.01)

(56) References Cited

U.S. PATENT DOCUMENTS

| | | | |
|---|---|---|---|
| 2007/0024615 A1* | 2/2007 | Keller | G06T 15/06 |
| | | | 345/421 |
| 2007/0273711 A1 | 11/2007 | Maffei | |
| 2009/0327894 A1* | 12/2009 | Rakib | G11B 27/34 |
| | | | 715/719 |
| 2011/0216090 A1* | 9/2011 | Woo | G06K 9/00 |
| | | | 345/633 |
| 2013/0328762 A1* | 12/2013 | McCulloch | G02B 27/017 |
| | | | 345/156 |
| 2014/0002498 A1 | 1/2014 | Lee et al. | |
| 2014/0052415 A1* | 2/2014 | Baran | G06F 17/50 |
| | | | 703/1 |
| 2014/0125577 A1* | 5/2014 | Hoang | G06F 3/017 |
| | | | 345/156 |
| 2015/0134095 A1* | 5/2015 | Hemani | G06T 19/00 |
| | | | 700/98 |
| 2015/0355711 A1* | 12/2015 | Rihn | G06F 3/011 |
| | | | 340/407.2 |
| 2017/0132842 A1* | 5/2017 | Morrison | G06T 19/006 |
| 2017/0154471 A1* | 6/2017 | Woo | G06T 7/11 |
| 2017/0320179 A1 | 11/2017 | Nelaturi et al. | |
| 2018/0121942 A1* | 5/2018 | Vlassis | G06Q 30/0204 |
| 2018/0204160 A1* | 7/2018 | Chehade | G05B 19/41865 |

OTHER PUBLICATIONS

Bimber, et al., "Spatial Augmented Reality:Merging Real and Virtual Worlds," In: AK Peters/ CRC Press, Aug. 8, 2005, retrieved on Jun. 1, 2019, http://web.media.mit.edu/~raskar/book/BimberRaskarAugmentedRealityBook.pdf, 97 pages.

* cited by examiner

FIG. 2 Types of Augmented Reality Devices

FIG. 3
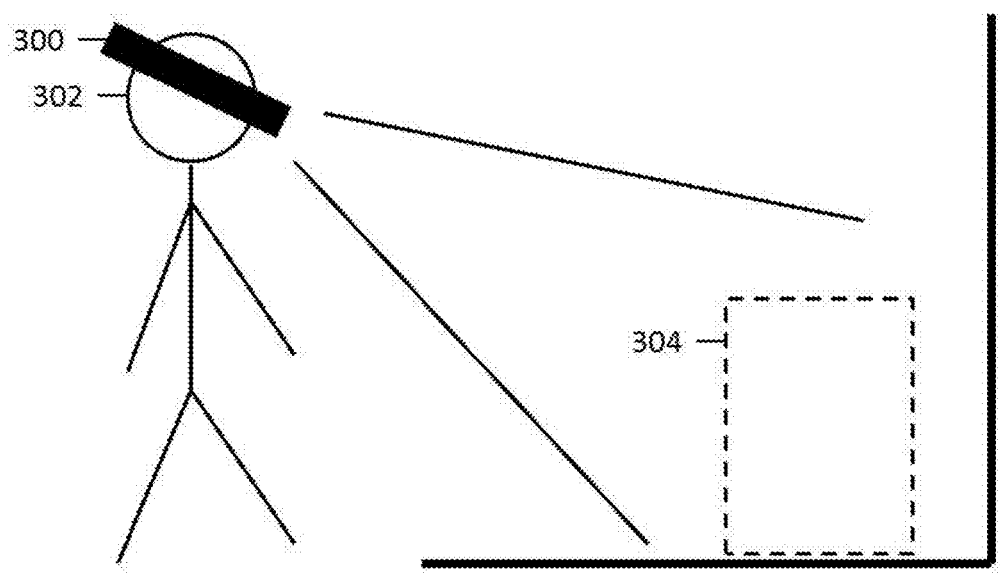
 = Augmented Reality Content overlaid in the real-world environment being viewed through headset or smart glasses device.

FIG. 4
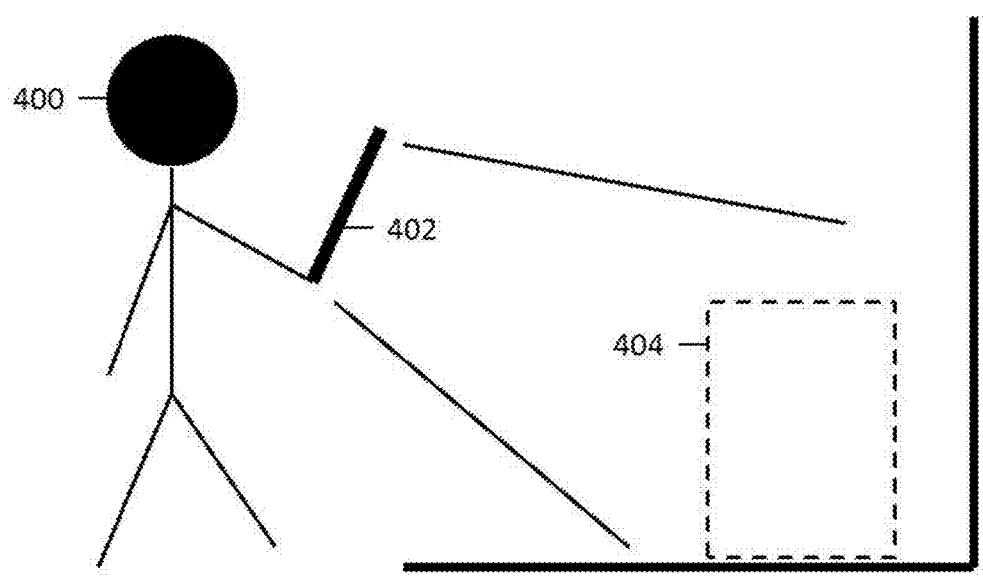
 = Augmented Reality Content overlaid in the real-world environment being viewed through tablet or smart phone device.

Duration: ~1+ ms to ~1+ seconds.
On same device, no additional resources required.

Mesh Geometry used to draw AR Content.

Polygon Geometry used for Additive and Subtractive Modeling.

Additive Modeling: Add B to A. Keep "Outside" of A with B, Keep "Outside" of B with A.

Subtractive Modeling: Subtract B from A. Keep "Outside" of A with B, Keep "Inside" of B with A.

FIG. 13 1300

Modeling Commands:

Add Prim1 — 1314

Sub Prim2 — 1316

Sub Prim3 — 1318

⋮

Add — 1302
Sub — 1306
Prim1 — 1304
Sub — 1310
Prim2 — 1308
Prim3 — 1312

Non minimal-split BSP Tree construction causing geometry split (slower).

Minimal-split BSP Tree construction avoiding geometry split (faster).

REAL-TIME SPATIAL AUTHORING IN AUGMENTED REALITY USING ADDITIVE AND SUBTRACTIVE MODELING

RELATED APPLICATION

The present disclosure claims priority to U.S. Provisional Patent Application Ser. No. 62/649,434, filed Mar. 28, 2018, which is incorporated by reference herein in its entirety.

BACKGROUND OF THE DISCLOSURE

Technical Field

This disclosure is directed to systems and methods for allowing users to create and update in real-time immersive spatial regions such as, but not limited to, rooms, hallways, doorways, etc. as augmented reality content displayed through an augmented reality device in a real world environment.

Background of the Related Art

Augmented reality is the display of two-dimensional (2D) or three-dimensional (3D) visual content that is overlaid on a real world environment. Devices used to display augmented reality content are typically a headset, smart glasses, a tablet, or a smart phone that supports augmented reality technology through their hardware and/or software. Current augmented reality systems limit the users' ability to perform any spatial authoring on augmented reality content in their real world environment. Users may construct a layout of a real-world environment represented as triangle meshes displayed in augmented reality which is known as spatial mapping. However, the constructed layout remains static; the user cannot modify the constructed layout after it has been created. For example, the user cannot add an additional room and connect it to the room that has already been constructed to make a larger room. Instead, the modification must be done offline outside of the augmented reality device, usually in a 3D modeling application on a desktop system. The modified content must then be loaded back into the augmented reality device to be displayed as augmented reality content in the real-world environment. This process is inefficient, often requiring many hours to several days as well as additional software and computing resources depending on the amount of content.

BRIEF SUMMARY

The disclosed subject matter may provide systems and methods that allow a user to spatially author immersive augmented reality content overlaid in a real-world environment in real-time. The disclosed systems and methods may allow the user to perform spatial authoring of augmented reality content in real-time directly on their augmented reality device.

Spatial authoring as described herein may refer to the creation of 3D regions by selecting pre-defined geometric primitives from a graphical user interface (GUI) menu, and/or manually picking 3D points in the real-world environment that will make up the 3D region. The 3D regions created may be cubic, rectangular, or convex polyhedral volumes. The picking of the points to construct the spatial regions may be generated by the augmented reality supported device, which may comprise, without limitation, a headset, smart glasses, tablet, and/or smart phone. The point picking on the augmented reality supported device may be triggered by a device-based gesture. Although augmented reality content can be 3D or 2D, the disclosed subject matter will focus on 3D content. The augmented reality content disclosed herein may refer to visual data that may be viewed through an augmented reality device. The augmented reality content may cover both the input spatial regions that can be additive or subtractive and the output regions that represent the geometry result returned from the implemented modeling library. Subtractive regions may have internal structures that are meant to be viewed from the interior; therefore, indoor environments are often created from subtractive regions. Additive regions have external structures that are viewed from the exterior; thus outdoor environments are created from additive regions. By creating a combination of additive and subtractive regions, a physical real-world environment may be reproduced as augmented reality content.

The implemented modeling library that processes the input additive and subtractive regions may be implemented in hardware, software, and/or firmware for any headset, smart glasses, tablet, smart phone, and/or any other device that supports the augmented reality capabilities such as, for example, six degrees of freedom (6 DOF) tracking and depth sensing or 3D plane detection. The methods and systems described in this disclosure may allow architects, interior/exterior designers, contractors, and other users for the first time to author and update their designs in the real-world environment in real-time on a single device without requiring several hours to days on multiple devices, thus speeding up a design process.

BRIEF DESCRIPTION OF THE DRAWINGS

For a more complete understanding of the present invention and the advantages thereof, reference is now made to the following descriptions taken in conjunction with the accompanying drawings, in which:

FIG. 3 illustrates an example of how a user may view augmented reality content through a headset or smart glasses device, in accordance with embodiments of the present disclosure;

FIG. 4 illustrates an example of how a user may view augmented reality content through a tablet or smart phone device, in accordance with embodiments of the present disclosure;

FIG. 13 illustrates example modeling commands that may be used, in accordance with embodiments of the present disclosure;

DETAILED DESCRIPTION

Figure 1:
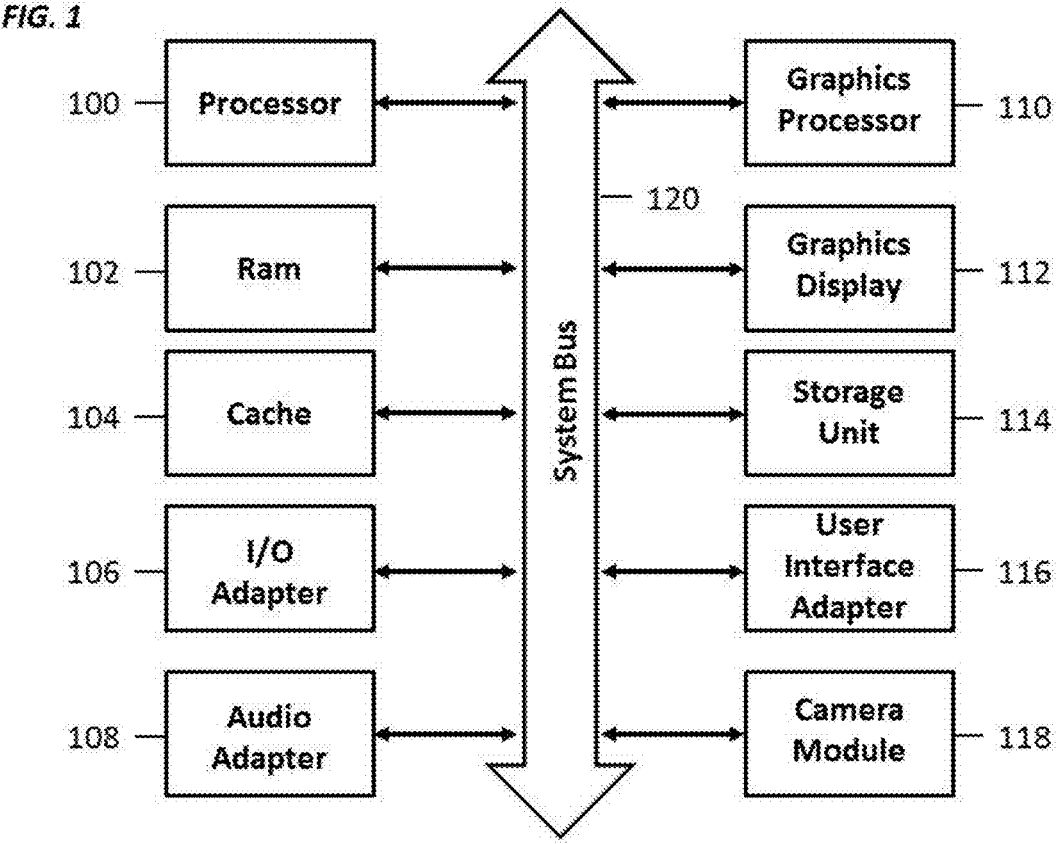
FIG. 1 illustrates an example data processing system, in accordance with embodiments of the present disclosure.
Figure 2:
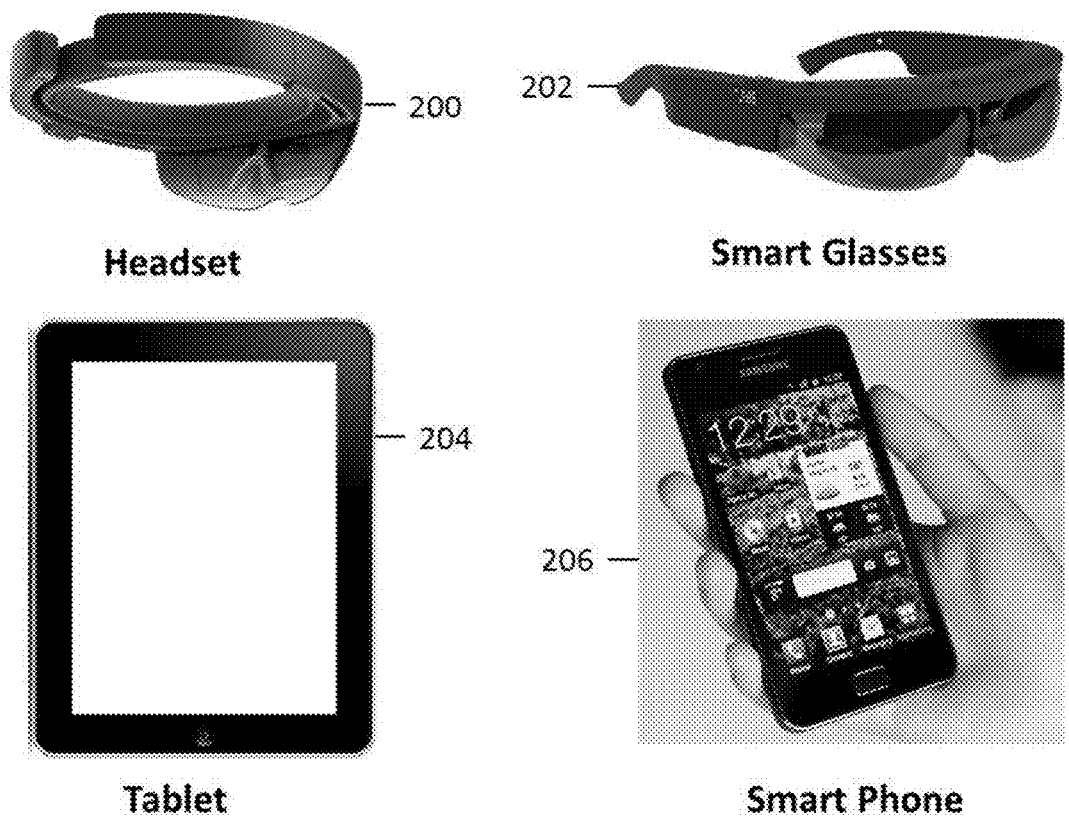
FIG. 2 illustrates example augmented reality devices, in accordance with embodiments of the present disclosure.
Figure 5:
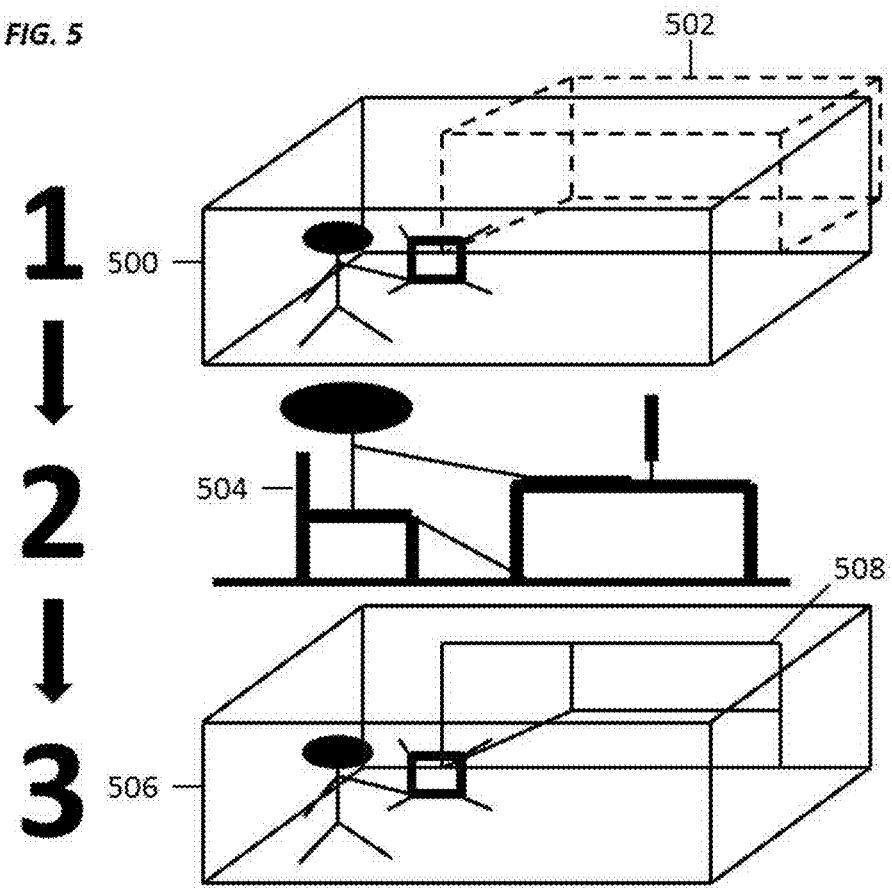
FIG. 5 illustrates the steps of an example technique for performing spatial authoring, as is known in the art.

FIGS. 1 through 18, discussed below are by way of illustration only and should not limit the scope of the disclosure. The system described in FIG. 1 is not limited to the devices mentioned in FIG. 2 and may represent any device that comprises of one or more of the components in FIG. 1. The systems and methods described herein may be implemented on any system, device, or apparatus comprising one or more of the components in FIG. 1. FIGS. 3 and 4 may represent typical augmented reality use cases for the devices in FIG. 2 but are not limited to those devices shown in FIGS. 3 and 4. FIG. 5 illustrates a known technique for spatially authoring content in augmented reality. In step 1 of FIG. 5, using a tablet-like augmented reality device, a user may map out a room that is shown as a wireframe cube 500 that the user is standing in. The user may then create another room represented as a dotted wireframe cube 502 that may touch the initial wireframe cube 500. At this point, the dotted wireframe cube 502 may be hidden by the wireframe cube 500 when the rooms are rendered as solid augmented reality content through the augmented reality device. This is because the wall of the initial wireframe cube 500 that touches the dotted wireframe cube 502 may obscure the entire dotted wireframe cube 502.

In step 2 of FIG. 5, the user must export the two authored rooms as 3D geometry in a known 3D file format and then load the 3D file into a 3D modeling application on a desktop computer system. Using the 3D modeling application on the desktop system, the user may then combine the two rooms by creating an opening in the wall that connects the two rooms allowing the dotted wireframe cube 502 to now be visible from the initial wireframe cube 500. In step 3 of FIG. 5, the updated data that now comprises the two connected rooms that are visible to each other may be imported back into the augmented reality device and viewed in the real-world environment through the augmented reality device. Notice in step 3 of FIG. 5 how the two rooms 506 and 508 may now be connected as one structure. The wall connecting the two rooms that previously obscured the dotted wireframe cube 502 in step 1 of FIG. 5 may now have an opening through which the dotted wireframe cube 502 may now be visible. As indicated in FIG. 5, the total execution time of all the steps may take between one or more hours to one or more days depending on the number of spatial regions processed. This is quite inefficient and time consuming. The source of the lengthy execution time may be in step 2 of FIG. 5 in which the geometric processing of the two rooms must be done on an external system outside of the augmented reality device requiring additional resources and time. This time consuming workflow of a known technique is currently used by many "Scan to CAD" services that require a two-day processing period.

Figure 6:
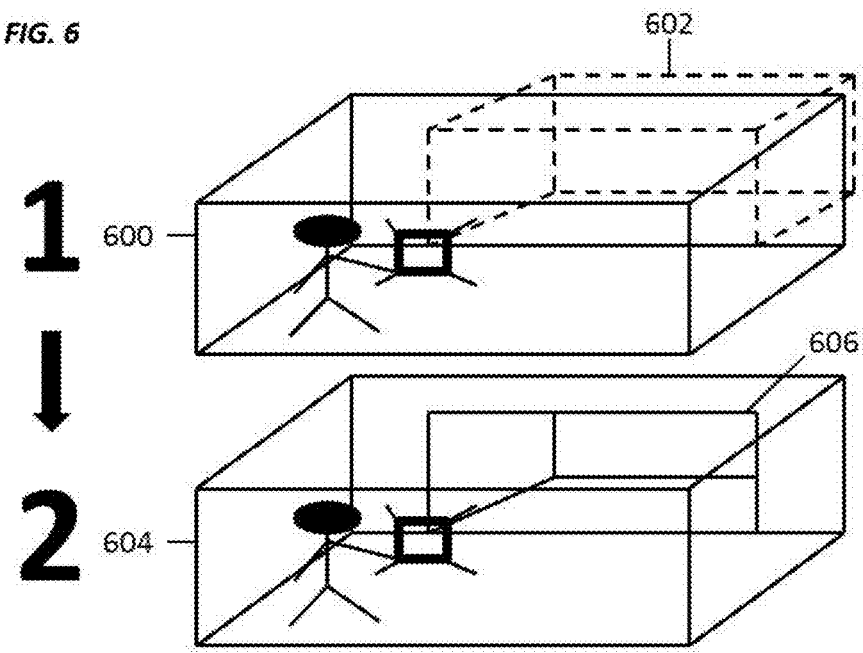
FIG. 6 illustrates the steps of an example technique for performing spatial authoring, in accordance with embodiments of the present disclosure.

FIG. 6 illustrates an example technique for spatially authoring content in augmented reality in accordance with embodiments of the present disclosure. Similar to step 1 in FIG. 5, in step 1 of FIG. 6, the first room 600 may be mapped, followed by a second room 602 that may be visually obscured by the first room 600. However, step 2 in FIG. 6 may be significantly different from step 2 in FIG. 5. In step 2 of FIG. 6, geometric processing may be performed directly on the augmented reality device instead of being performed on an external system outside of the augmented reality device. Because of the direct processing of geometric data on the augmented reality device, the time-consuming workflow of exporting and processing the geometric data on an external system may be avoided. The geometric result showing the two rooms 604 and 606 connected as one structure may be displayed as augmented reality content in the real-world environment as viewed through the augmented reality device. The total execution time of steps 1 and 2 in FIG. 6 may take between one or more milliseconds to one or more seconds allowing the execution to be in real-time. The term "real-time" generally refers to the number of frames that are drawn within one second which is usually 30. The term "frame" refers to a fixed number of pixels arranged horizontally and vertically as a rectangle that are drawn in the viewport of an augmented reality device. The lower bound of the total execution time range 0.001+ seconds is within the real-time scale of 0.0333 seconds therefore allowing the total execution time on an augmented reality device to be in real-time.

Figure 7:
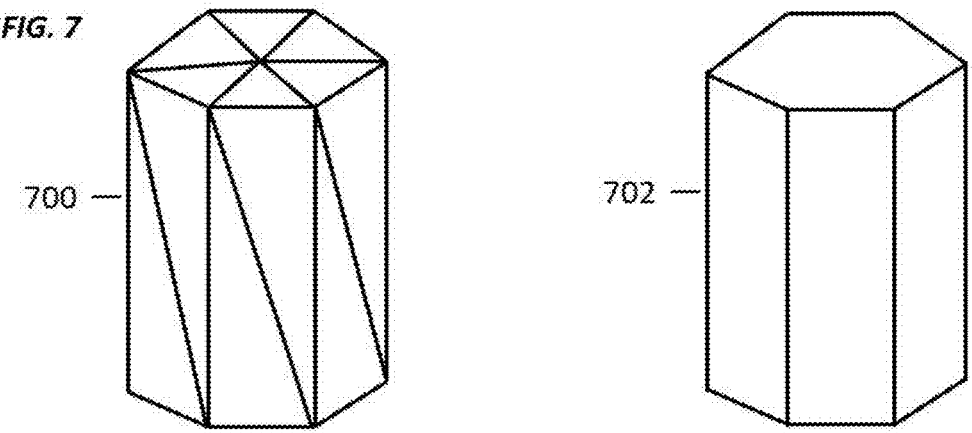
FIG. 7 illustrates example types of geometry that may be used, in accordance with embodiments of the present disclosure.
Figure 8:
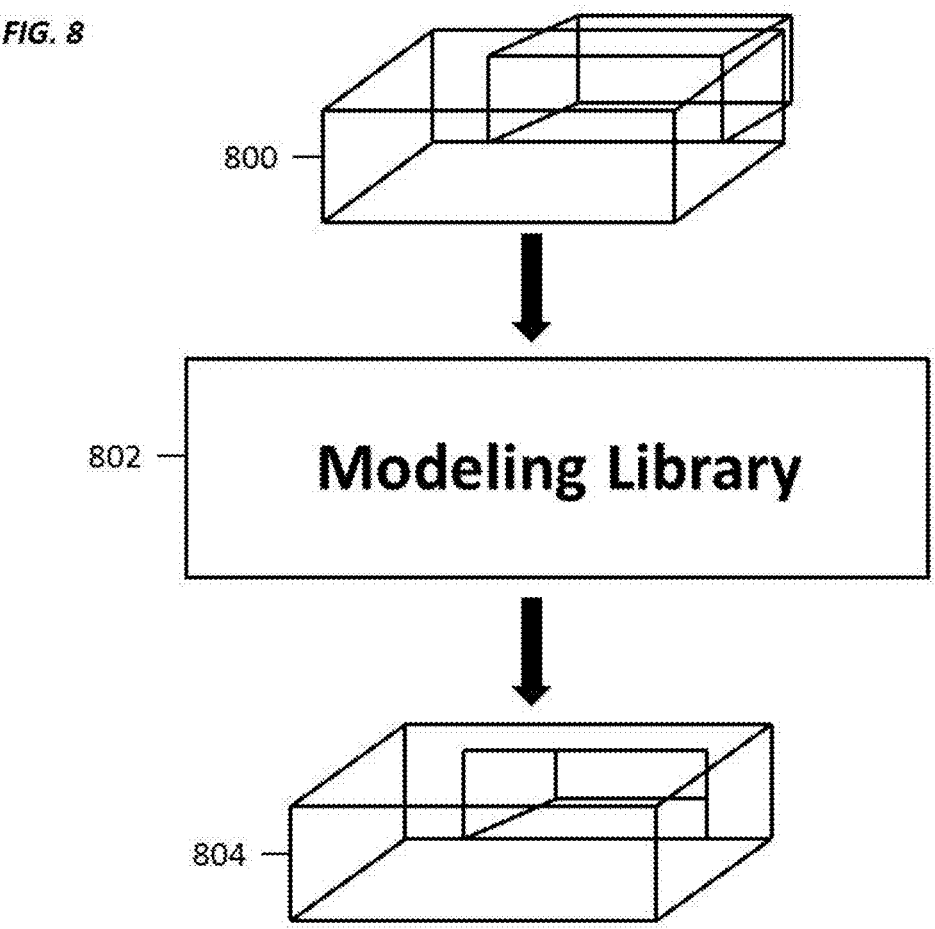
FIG. 8 illustrates a simplified data flow, in accordance with embodiments of the present disclosure.
Figure 9:
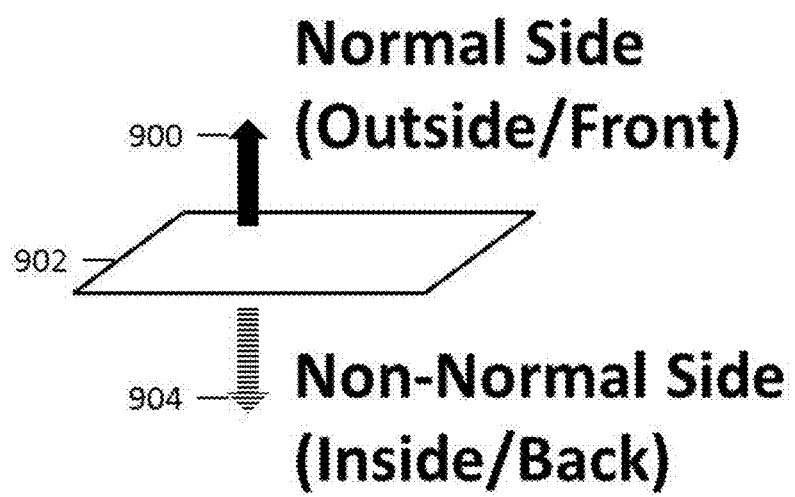
FIG. 9 illustrates the sides of an example polygon that may be used, in accordance with embodiments of the present disclosure.

FIG. 8 represents an example data flow of the geometry data 800 and 804 in a modeling library 802 in accordance with embodiments of the present disclosure. The input geometry 800 represented as 500 and 502 in FIG. 5, and 600 and 602 in FIG. 6 may be passed to the modeling library 802 for geometric processing. The result and geometry 804 represented as 604 and 606 in FIG. 6 may be returned from the modeling library and rendered as augmented reality content in the real-world environment through the view of the augmented reality device. FIG. 7 illustrates example types of geometry that may be used. Mesh geometry 700 may be used for drawing augmented reality content in the view of the augmented reality device. Mesh geometry 700 may be comprised of a list of vertices, a list of normals, and a list of vertex indices in which every 3 indices in the list may refer to a triangle. Polygon geometry 702 may be used by the modeling library for geometric processing. Polygon geometry 702 may be a more data compact form that is comprised of a list of flat convex polygons that may each have a list of vertices, and a single normal vector describing the direction of the polygon. Each polygon 902 in the polygon geometry 702 may have two sides 900 and 904 as illustrated in FIG. 9. The normal side 900 may represent the front side or outside 900 of the polygon 902. The non-normal side 904 may represent the back side or inside 904 of the polygon 902.

Figure 10:
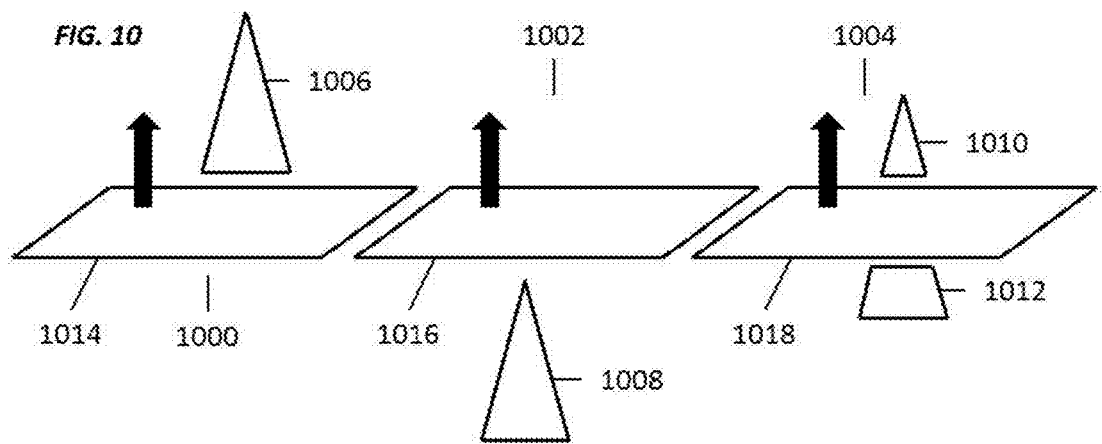
FIG. 10 illustrates polygon classification cases that may be used, in accordance with embodiments of the present disclosure.
Figure 11:
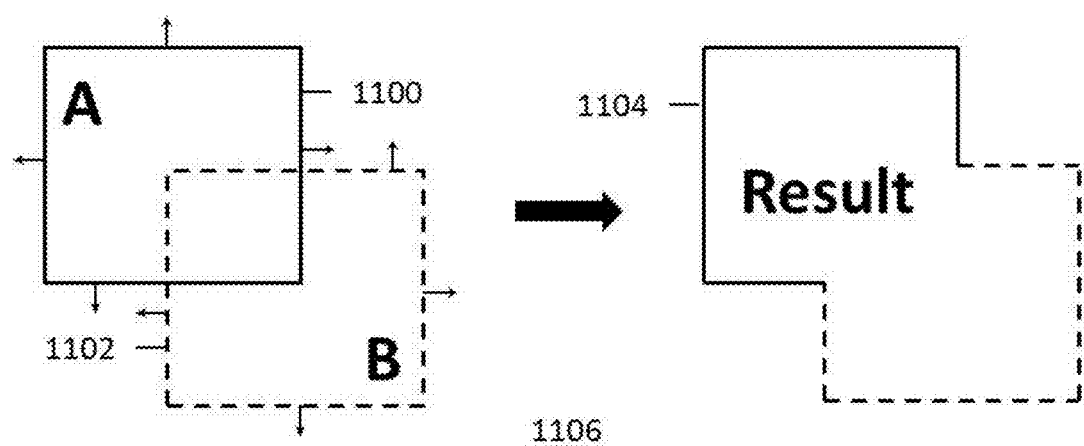
FIG. 11 illustrates an example additive modeling method that may be used, in accordance with embodiments of the present disclosure.

The side of a polygon may play a crucial role in the geometric processing of additive and subtractive polygon geometry in the modeling library. Using the normal and a vertex from a polygon, a 3D plane 1014-1018 may be defined as shown in FIG. 10. Based on a given 3D plane 1014-1018 in 3D space, other polygons in that same 3D space may be classified with respect to the 3D plane 1014-1018 and fall into three category types as shown in FIG. 10. The category type of a polygon may be determined by computing the signed distance of each polygon's vertex with a 3D plane and tallying up the total of positive, negative, and zero distance values. If the total number of positive distance values is equal to the number of polygon vertices then the polygon may be classified as being outside of the 3D plane which is Case 1 1000 in FIG. 10. If the total number of negative distance values is equal to the number of polygon vertices then the polygon may be classified as being inside of the 3D plane which is Case 2 1002 in FIG. 10. If the total number of zero distance values is equal to the number of polygon vertices then the polygon is considered to be coplanar with the 3D plane and an additional test may be required. The additional test involving the coplanar polygon may check the direction of the polygon normal and may classify the polygon as being outside of the 3D plane which is Case 1 1000 in FIG. 10 if the polygon normal is pointing in the same direction as the 3D plane normal, otherwise the polygon may be classified as being inside of the 3D plane which is Case 2 1002 in FIG. 10. If the total number of positive, negative, and zero distance values do not equal the number of polygon vertices then the polygon may be classified as spanning the 3D plane which is Case 3 1004 in FIG. 10. A polygon may be spanning a 3D plane when some of its vertices are on the outside of the 3D plane while its other vertices are on the inside of the 3D plane. When spanning polygon Case 3 1004 occurs, the polygon may be split by the 3D plane 1018 into two fragments with one fragment being on the outside 1010 and the other fragment being on the inside 1012 with the original spanning polygon being destroyed.

For any input polygon geometry that represents a 3D region in augmented reality, its list of polygons may be classified and marked as either inside or outside. Input polygon geometry may either be subtractive or additive. Each input geometry primitive may be comprised of two items: 1) the list of polygons representing the input geometry and 2) the operation for the input geometry which can be either additive or subtractive. For a list of input polygon geometry data, the items in the list may be processed as pairs, with one item being the current input item, and the other item being the current cumulative result from previous processed items. In FIG. 13 for example, each input geometry primitive may be represented as a modeling command 1314-1318. As each modeling command is processed, the next modeling command may be processed with the result of the previous modeling commands. Therefore, modeling command "Sub Prim2" 1316 in FIG. 13 may be processed with the result of the previous modeling command "Add Prim1" 1314 in FIG. 13. Likewise, modeling command "Sub Prim3" 1318 in FIG. 13 may be processed with the result of modeling commands "Add Prim1" 1314 and "Sub Prim2" 1316 in FIG. 13. For each item pair that is processed, a polygon list may be constructed for each item with all the polygons in one list being marked and classified against the polygons in the other list. Based on the operation which may be either additive or subtractive, the compared polygons may either be kept or discarded from both lists. The remaining polygons that are left over from both list comparisons are returned as the result.

Figure 12:
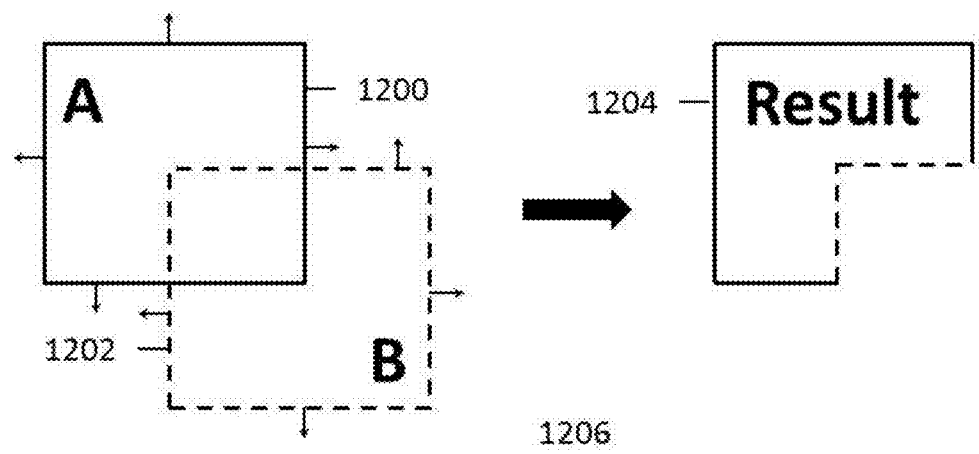
FIG. 12 illustrates an example subtractive modeling method that may be used, in accordance with embodiments of the present disclosure.

In FIG. 12 for example, "A" 1200 may represent the current cumulative result and "B" 1202 may represent the current modeling command "Sub B" for a subtractive input geometry. A polygon list for the current cumulative result "A" 1200 may be constructed. A polygon list for the current subtractive input geometry "B" 1202 may also be constructed. Because the current modeling command is subtractive, the following subtractive modeling comparison rule may be applied: Keep "Outside" of polygon geometry "A" that is compared to the plane geometry in "B"; and keep "Inside" of polygon geometry "B" that is compared to the plane geometry in "A" 1206. The resulting polygon list from this subtractive modeling rule may be represented as "Result" 1204 in FIG. 12. Likewise, in FIG. 11 for the additive modeling case, the following additive modeling comparison rule may be applied: Keep "Outside" of polygon geometry "A" 1100 that is compared to the plane geometry in "B" 1102; keep "Outside" of polygon geometry "B" that is compared to the plane geometry in "A" 1106. The resulting polygon list from this additive modeling rule may be represented as "Result" 1104 in FIG. 11. The core of the modeling library may be comprised of the additive and subtractive modeling comparison rules mentioned above using the three polygon classification types mentioned in FIG. 10 earlier as the basis for the comparison rules.

Figure 14:
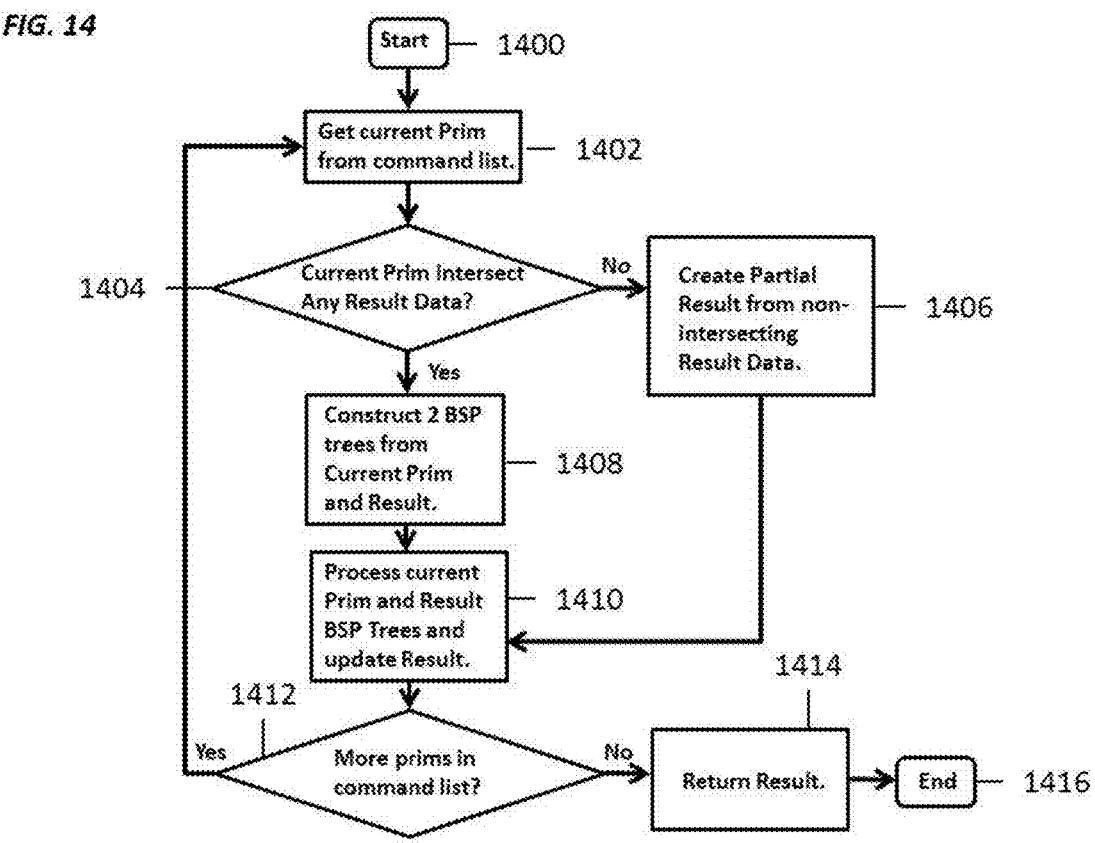
FIG. 14 illustrates an example execution flow diagram of an example implemented modeling library, in accordance with embodiments of the present disclosure.

Using the additive and subtractive modeling comparison rules, the modeling library may be implemented using the program flow diagram in FIG. 14 that may take in a list of input additive and subtractive polygon geometry and may return a list of output mesh geometry that may be drawn as augmented reality content through the view of the augmented reality device. A for loop may iterate through each input geometry primitive at 1402 in FIG. 14. A check may be performed at 1404 in FIG. 14 to determine if the current input geometry primitive intersects any data from the current cumulative result data. Any result data that intersects the current input geometry primitive may be added to a construction list that will be processed by step 1408. Any result data that doesn't intersect the current input geometry primitive may be added to a partial result list in step 1406. To speed up the processing time of the geometry comparisons, Binary Space Partition (BSP) trees may be used. BSP trees may allow entire 3D sub-spaces on the front side or back side of a plane to be skipped to reduce geometric processing time. A BSP tree may be constructed by iterating over a list of polygons and selecting a polygon from the list and creating a 3D plane from the polygon normal and a polygon vertex. The selected polygon may be removed and the remaining polygons in the list may then be classified against the current plane using the three classification types in FIG. 10. From this classification, a front list and back list of polygons may be created. The BSP tree construction may then be repeated for the remaining front and back lists until no more polygons are left to select.

In step 1408 in FIG. 14, a BSP tree may be constructed from the current input geometry primitive and the list of result data polygons that intersected the current input geometry primitive resulting in two BSP trees being created. In step 1410 in FIG. 14, the main geometry processing of the modeling library may be performed. The list of polygons comprising the current input geometry primitive may be compared against the BSP tree of the intersected result data. The list of polygons comprising the intersected result data may be compared against the BSP tree of the current input geometry primitive. During the polygon list to BSP tree comparison, each polygon in the polygon list may be iterated over and compared against the BSP tree starting at its root node. At each BSP tree node, the current polygon may be classified against the 3D plane of the current BSP tree node using the three types of classifications specified in FIG. 10. Using the additive or subtractive modeling comparison rule, the current polygon may either be kept or removed. If the current polygon is kept, it may be passed on to the next front and/or back node in the BSP tree if it exists and the comparison is repeated. The result polygon data of both list to BSP tree comparisons may be merged together into a single result list. If a partial result list was created earlier in step 1406, this partial result list may also be merged into the single result list at step 1410 in FIG. 14. At step 1412 in FIG. 14, if more input geometry primitives exist in the command list, the geometry processing loop may continue with the next input geometry primitive and the updated result data. If no more input geometry primitives exist in the command list, the updated result data may be returned as the final result in step 1414 in FIG. 14.

Figure 15:
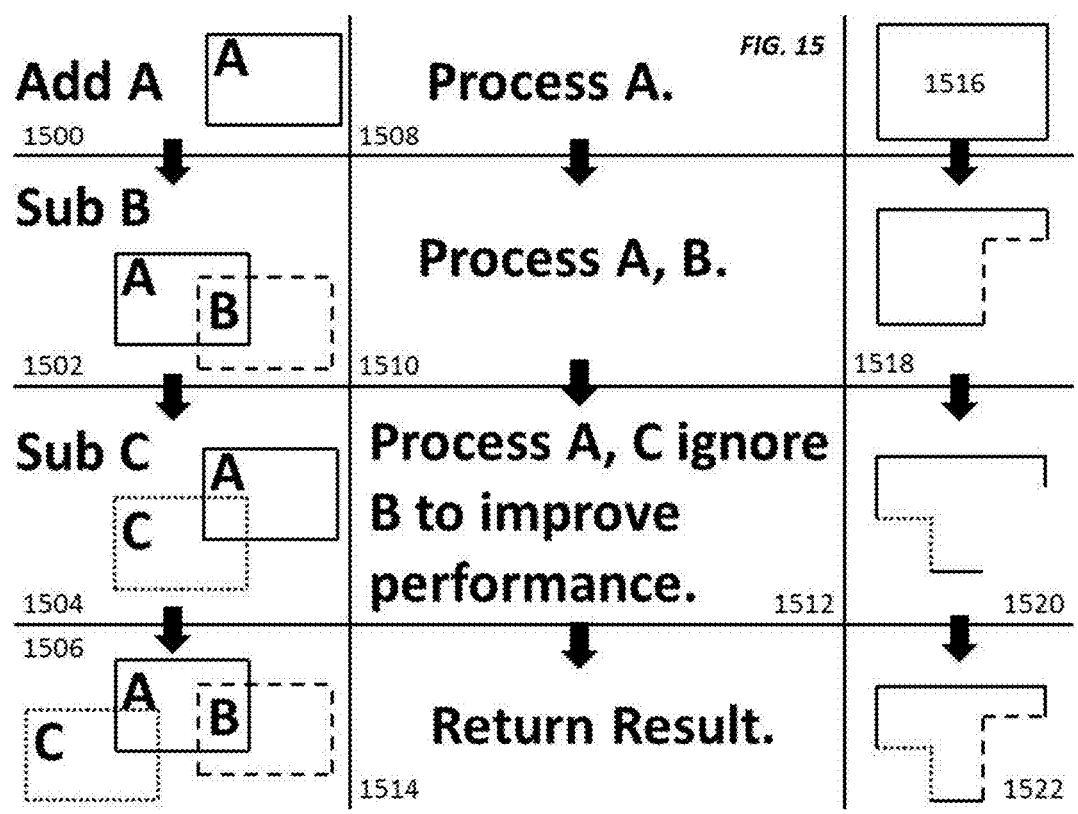
FIG. 15 illustrates an example geometry reduction optimization that may be used, in accordance with embodiments of the present disclosure.
Figure 16:
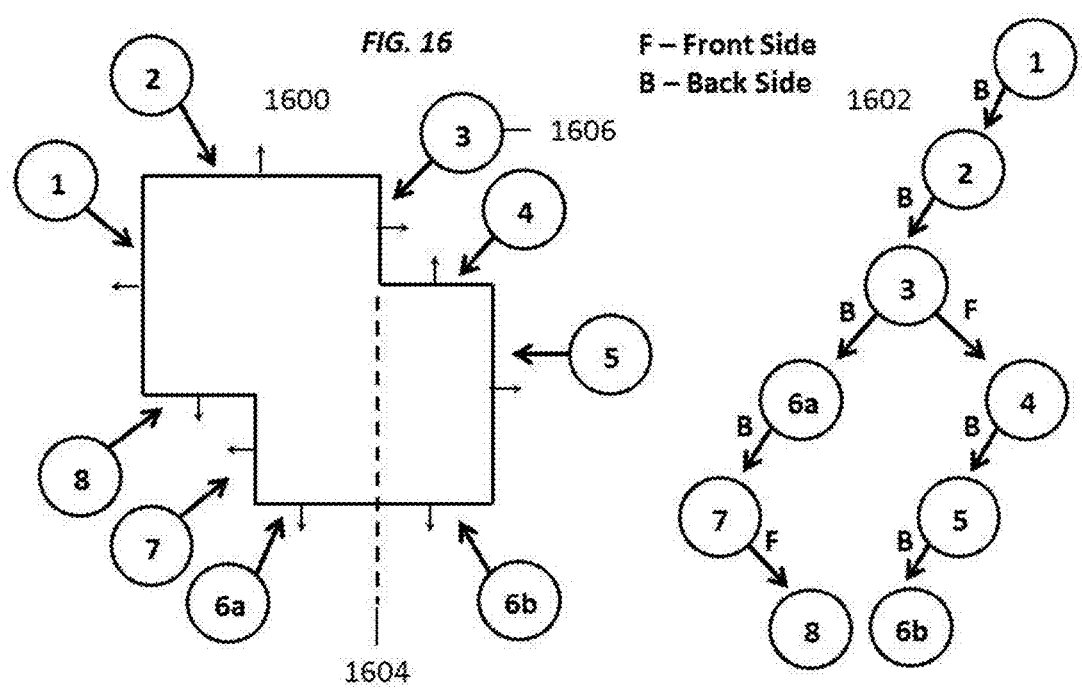
FIG. 16 illustrates an example slower non minimal-split Binary Space Partition (BSP) tree construction method, in accordance with embodiments of the present disclosure.

Two key optimizations may work together to allow the geometric processing of the modeling library to be performed in real-time. The first key optimization may be removal of any geometry data from the current cumulative result data that doesn't intersect the current input geometry primitive in step 1404 in FIG. 14. The intersection test may involve checking the axis aligned bounding boxes of the current input geometry primitive and the result data for any overlaps. This step may remove any unnecessary result data geometry that does not intersect the current input geometry primitive which may reduce the amount of geometry data that may be processed by the modeling library. FIG. 15 illustrates the optimization. In steps 1500 through 1504 in FIG. 15, three modeling example commands are performed: "Add A", "Sub B", and "Sub C". In step 1504, when the "Sub C" command is performed on the cumulative result of "Add A" and "Sub B", the result geometry comprising of "Sub B" may be ignored and not included in the BSP tree construction list to improve performance. This early rejection may be achieved by tagging the polygons of each input geometry primitive with a unique numerical value. This numerical value assigned to the polygons for each input geometry primitive may be carried over into the result data that is produced after the geometry processing. This may allow any group of polygons to be extracted from the current cumulative result data and have a bounding box constructed to test that polygon group for rejection. The second key optimization may be the minimal-split BSP tree construction heuristic used during step 1408 in FIG. 14 before the geometry processing. During BSP tree construction, a partition may be selected to add as a node to the BSP tree. Care must be taken when selecting the partition plane, because the size and structure of the BSP tree may be influenced by the selection of the partition plane. FIG. 16 shows an example BSP tree construction without using the minimal-split heuristic. Note that a geometry split occurs at 1604 resulting in an increased number of BSP tree nodes constructed because the partition plane "3" 1606 splits a polygon into two fragments "6a" and "6b" 1604. FIG. 16 illustrates a simplified case with just two input regions, but if there were a large number of input regions the performance of the geometry processing using the non-minimal-split constructed BSP trees could be very slow. A minimal-split BSP tree may be constructed by iterating over a list of polygons and then for each polygon performing a classification against all the other polygons in the list using the three classification types in FIG. 10. The number of "spanning" types may be totaled for each polygon in which the polygon with the lowest "spanning" total is selected.

Figure 17:
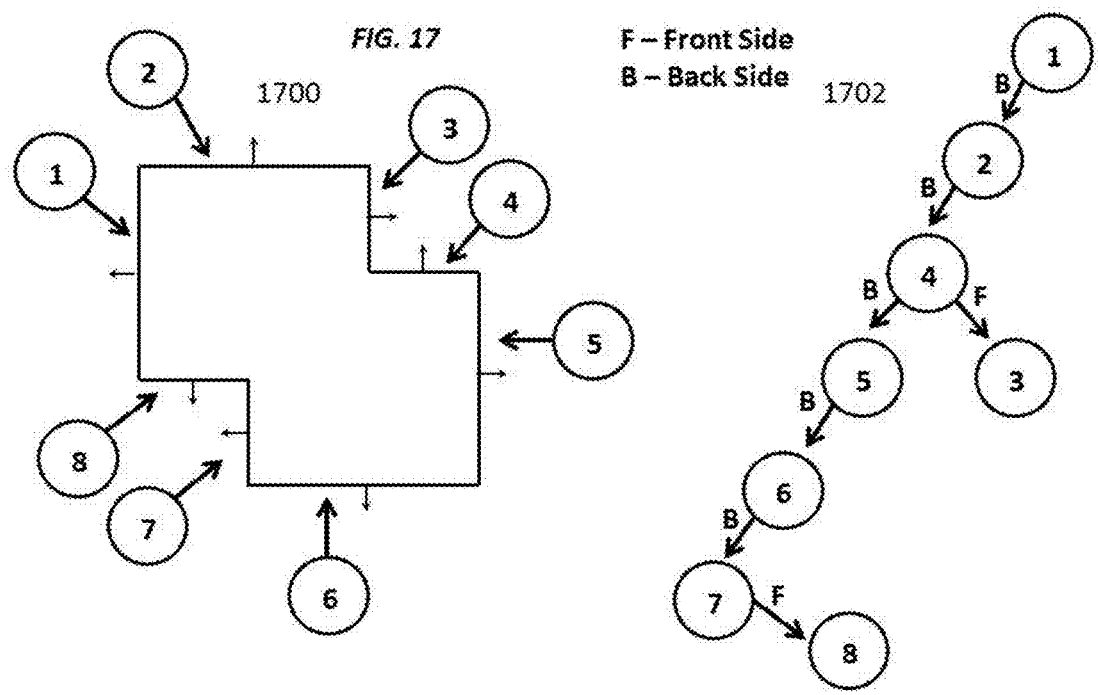
FIG. 17 illustrates an example faster minimal-split BSP Tree construction method used, in accordance with embodiments of the present disclosure.
Figure 18:
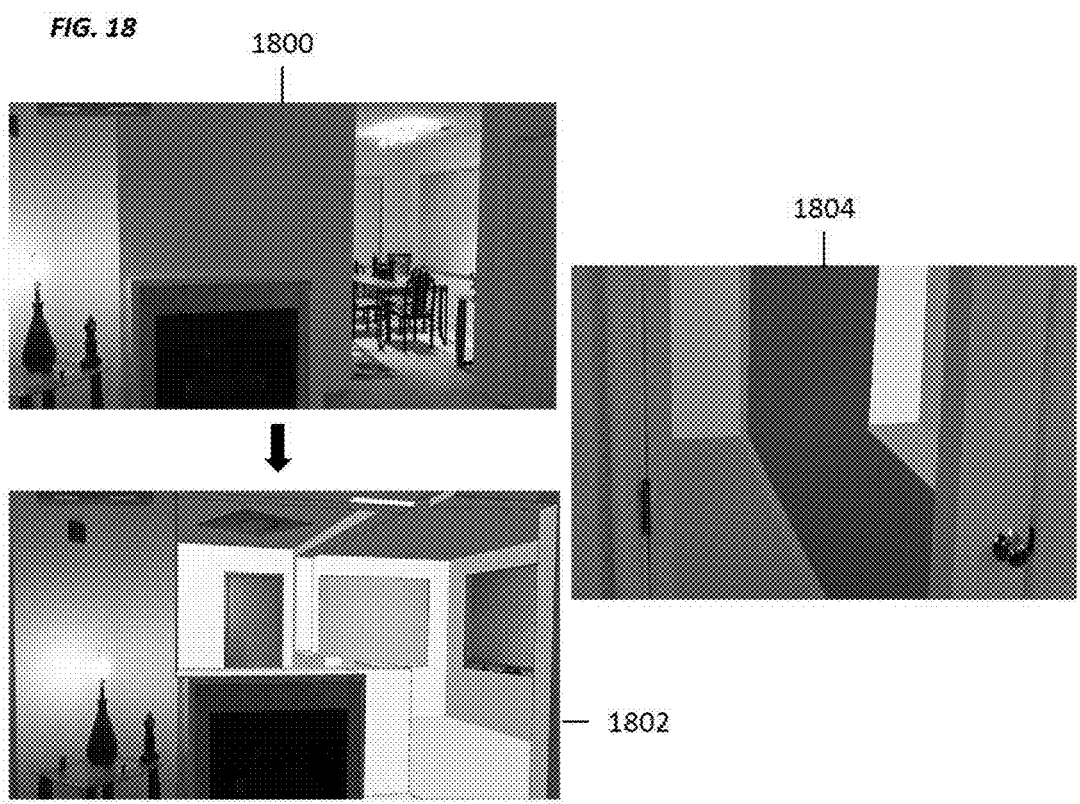
FIG. 18 illustrates example screen captures of the actual immersive Spatially Authored augmented reality content produced by the disclosed embodiment on augmented reality devices, in accordance with embodiments of the present disclosure.

FIG. 17 shows a BSP tree construction using the minimal-split heuristic on the same two input regions from FIG. 16. Note that a geometry split is avoided which may prevent an increase in the number of BSP tree nodes constructed when compared to FIG. 16. By minimizing the number of geometry splits during BSP tree construction and thus minimizing the number of BSP tree nodes created, the performance of the geometry processing using the minimal-split constructed BSP trees may be faster. Although the additive and subtractive modeling operations were covered in this disclosure, the intersection modeling operation along with the appropriate modeling comparison rule can be implemented as well and the same key optimizations and geometry processing would support the intersection modeling operation as well. By implementing the key optimizations along with the modeling method described in this disclosure, the spatial authoring of immersive augmented reality content on an augmented reality device in real-time may be achieved as shown in FIGS. 18 1800-1804.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A method for spatially authoring data in a data processing system, comprising:
    constructing one or more input spatial geometry regions;
    iterating through each input spatial geometry region to create current cumulative result data and rejecting geometry groups from the current cumulative result data;
    for each particular input spatial geometry region of the one or more input spatial geometry regions:
        constructing minimal-split Binary Space Partition trees from the particular input spatial geometry region and current cumulative result data;
        performing geometry processing by applying an additive modeling comparison rule to keep geometry outside of the particular input spatial geometry region with the current cumulative result data, and keep geometry outside of the current cumulative result data with the particular input spatial geometry region; and
        performing geometry processing by applying a subtractive modeling comparison rule to keep geometry outside of the particular input spatial geometry region with the current cumulative result data, and keep geometry inside of the current cumulative result data with the particular input spatial geometry region; and
    generating final result geometry after iterating over all of the one or more input spatial geometry regions.

2. The method of claim 1, wherein the input spatial geometry regions are three-dimensional convex representations.

3. The method of claim 1, wherein the method is performed within an augmented reality-supported device.

4. The method of claim 3, wherein the device comprises one of a headset, smart glasses, a tablet, and a smart phone.

5. The method of claim 1, wherein all of the steps of the method are performed within a single device.

6. The method of claim 1, wherein all of the steps of the method are performed in real-time.

7. A system comprising a non-transitory computer-readable storage medium encoded with computer-executable instructions that, when executed, cause a data processing system to perform the steps of:
    constructing one or more input spatial geometry regions;
    iterating through each input spatial geometry region to create cumulative result data and rejecting any geometry groups from the current cumulative result data;
    for each particular input spatial geometry region of the one or more input spatial geometry regions:
        constructing minimal-split Binary Space Partition trees from current input spatial geometry regions and current cumulative result data to speed up geometry processing;
        performing geometry processing by applying an additive modeling comparison rule to keep geometry outside of the input spatial geometry region with current cumulative result data, and keep geometry outside of the current cumulative result data with input spatial geometry region;
        performing geometry processing by applying a subtractive modeling comparison rule to keep geometry outside of the input spatial geometry region with current cumulative result data, and keep geometry inside of the current cumulative result data with input spatial geometry region; and
    generating final result geometry after iterating over all of the one or more input spatial geometry regions.

8. The system of claim 7, wherein the input spatial geometry regions are three-dimensional convex representations.

9. The system of claim 7, wherein the system is an augmented reality supported device.

10. The system of claim 9, wherein the system comprises one of a headset, smart glasses, a tablet, and a smart phone.

11. The system of claim 7, wherein all of the steps of claim 7 are performed within a single device.

12. The system of claim 7, wherein all the steps of claim 7 are performed in real-time.

13. An apparatus, comprising:
    a processor;
    a display;
    a camera; and
    program code executed by the processor to perform the steps of:
    constructing one or more input spatial geometry regions;
    iterating through each input spatial geometry region to create the current cumulative result data and rejecting any groups from the current cumulative result data;
    for each particular input spatial geometry region of the one or more input spatial geometry regions:
        constructing minimal-split Binary Space Partition trees from the particular input spatial geometry region and the current cumulative result data;
        performing geometry processing by applying an additive modeling comparison rule to keep geometry outside of the input spatial geometry region with the current cumulative result data, and keep geometry outside of the current cumulative result data with the particular input spatial geometry region; and
        performing geometry processing by applying a subtractive modeling comparison rule to keep geometry outside of the input spatial geometry region with the current cumulative result data, and keep geometry inside of the current cumulative result data with the particular input spatial geometry region; and
    generating final result geometry after iterating over all of the one or more input spatial geometry regions.

14. The apparatus of claim 13, wherein the input spatial geometry regions are three-dimensional convex representations.

15. The apparatus of claim 14, wherein the apparatus is an augmented reality-supported device.

16. The apparatus of claim 15 wherein the apparatus comprises one of a headset, smart glasses, a tablet, and a smart phone.

17. The apparatus of claim 13, wherein all the steps of claim 13 are performed on the same apparatus.

18. The apparatus of claim 13, wherein all the steps of claim 13 are performed in real-time.

\* \* \* \* \*